US012174742B2

(12) United States Patent
Blagodurov et al.

(10) Patent No.: US 12,174,742 B2
(45) Date of Patent: Dec. 24, 2024

(54) MULTI-INSTANCE RECURRENT NEURAL NETWORK PREDICTION

(71) Applicant: ADVANCED MICRO DEVICES, INC., Santa Clara, CA (US)

(72) Inventors: Sergey Blagodurov, Bellevue, WA (US); Thaleia Dimitra Doudali, Bellevue, WA (US); Amin Farmahini Farahani, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1235 days.

(21) Appl. No.: 16/220,462

(22) Filed: Dec. 14, 2018

(65) Prior Publication Data

US 2020/0193268 A1 Jun. 18, 2020

(51) Int. Cl.
| | |
|---|---|
| *G06F 12/08* | (2016.01) |
| *G06F 3/044* | (2006.01) |
| *G06F 12/0862* | (2016.01) |
| *G06F 12/1009* | (2016.01) |
| *G06F 12/127* | (2016.01) |
| *G06N 3/045* | (2023.01) |

(52) U.S. Cl.
CPC ........ *G06F 12/0862* (2013.01); *G06F 3/0442* (2019.05); *G06F 12/1009* (2013.01); *G06F 12/127* (2013.01); *G06N 3/045* (2023.01); *G06F 2212/6026* (2013.01)

(58) Field of Classification Search
CPC ......... G06F 12/0862; G06F 2212/6024; G06F 2212/6026; G06F 12/127; G06F 2212/6028; G06F 12/12; G06N 3/08; G06N 3/0442
See application file for complete search history.

(56) References Cited

U.S. PATENT DOCUMENTS

| | | | |
|---|---|---|---|
| 2012/0005674 A1* | 1/2012 | Larimore | G06F 9/45537 718/1 |
| 2017/0228637 A1* | 8/2017 | Santoro | G06N 3/063 |
| 2018/0350684 A1* | 12/2018 | Mandal | H01L 22/22 |
| 2019/0213099 A1* | 7/2019 | Schmidt | G06N 3/044 |
| 2019/0340235 A1* | 11/2019 | Osbourne | G10L 19/083 |
| 2019/0347202 A1* | 11/2019 | Hasbun | G06F 12/0871 |
| 2019/0391920 A1* | 12/2019 | Gupta | G06N 20/00 |

(Continued)

OTHER PUBLICATIONS

Interconnections in Multi-core Architectures: Understanding Mechanisms, Overheads and Scaling by Kumar (Year: 2005).*

(Continued)

*Primary Examiner* — Paul M Knight

(57) ABSTRACT

A computer processing system having a first memory with a first set of memory pages resident therein and a second memory coupled to the first memory. A resource tracker provides information to instances of a long short-term memory (LSTM) recurrent neural network (RNN). A predictor identifies memory pages from the first set of memory pages for prediction by the one or more LSTM RNN instances. The system groups the memory pages of the identified plurality of memory pages into a number of patterns based on a number of memory accesses per time. An LSTM RNN instance predicts a number of page accesses for each pattern. A second set of memory pages is selected for moving from the first memory to the second memory.

20 Claims, 6 Drawing Sheets

(56) References Cited

U.S. PATENT DOCUMENTS

2020/0133489 A1* 4/2020 Martin ............... G06F 12/0842

OTHER PUBLICATIONS

Long Short Term Memory Based Hardware Prefetcher by Zeng (Year: 2017).*
Learning Memory Access Patterns by Hashemi (Year: 2018).*
Long Short Term Based Memory Hardware Prefetcher (Theses and Dissertation) (Year: 2017).*
Effective Adam-optimized LSTM Neural Network for Electricity Price Forecasting by Chang (Year: 2018).*
CPU Workload forecasting of Machines in Data Centers using LSTM Recurrent Neural Networks and ARIMA Models by Janardhanan (Year: 2017).*
NPL Zheng Long Short Term Based Memory Hardware Prefetcher 2017.*
Kung, Jaeha, et al., "Relaxed Pruning: Memory-Efficient LSTM Inference Engine by Limiting the Synaptic Connection Patterns", SysML '18, Feb. 2018, Stanford, California, 3 pages.
Hashemi, Milad, et al., "Learning Memory Access Patterns", Cornell University Library, arXiv.org:1803.02329, submitted Mar. 6, 2018, 15 pages.
Website: https://datawookie.netlify.com/blog/2017/04/clustering-time-series-data/, Collier, Andrew B., "Clustering Time Series Data", Apr. 25, 2017, 11 pages.
Website: http://pipiras.sites.oasis.unc.edu/timeseries/Multivariate_6_-_Classification_Clustering_-_Menu.html, Glotzer, Dylan, "Multivariate VI: Time Series Clustering/Classification", Mar. 2, 2017, 38 pages.

* cited by examiner

MULTI-INSTANCE RECURRENT NEURAL NETWORK PREDICTION

BACKGROUND

Computer memory hierarchies are becoming increasingly distributed and heterogeneous whereby different types of memory are placed in different parts of a device and in different locations across a cluster-based system or in a non-uniform memory access (NUMA) system such as those found in datacenters. Examples of different types of memory include volatile memory, non-volatile memory (NVM), stacked dynamic random access memory (DRAM), and off-package DRAM. Different memory types have one or more characteristics that vary from type to type across memory lifespan, an average latency or access time, a capacity, a memory permanence, and an energy consumption. Some processing systems enhance performance by implementing memory management schemes wherein data is transferred among the different memories based on the likelihood that the data will be accessed. However, conventional memory management schemes are relatively inflexible and have difficulty accommodating a wide variety of applications and memory page access patterns.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Memory pools of modern datacenters struggle to accommodate diverse datacenter demands. Further, memory hierarchies have become increasingly distributed and heterogeneous and often include different types of memory nodes (e.g., stacked DRAM, off-package DRAM, and non-volatile memory (NVM)) placed in different parts of various nodes that are coupled together across a system. Accordingly, it is often difficult to implement a memory management scheme that operates efficiently for the wide variety of applications and workloads supported by a datacenter.

Machine learning-based hardware and software techniques are used to predict useful memory pages based on one or more memory page access patterns occurring in one or more recent time-based epochs and to migrate the predicted pages in advance of demand to one or more memories having a faster access time. That is, demand for certain pages is anticipated and are moved close to respective processing cores ahead of actual processing. To do so, a predictor identifies pages by using multiple recurrent neural network (RNN) instances against a subset of resident memory pages. In some embodiments, one or more long short-term memory (LSTM) RNNs are implemented, wherein the LSTM RNNs learn one or more access patterns for selected groups of memory pages in real-time while a system having one or more processors operates to complete user defined processes and tasks.

According to some embodiments, a system determines how to allocate page prediction to a few available LSTM instances. Some memory pages are subjected to LSTM RNN prediction and the remaining memory pages are subjected to a default memory management scheme. Not all memory page accesses in a system can be assigned to an LSTM RNN because each LSTM RNN is computationally expensive to operate. Accordingly, the system assigns a selected subset of memory pages or memory page groups to one or more of a plurality of operating LSTM RNNs. This type of arrangement is a hybrid system for incorporating LSTM-based prediction for hard-to-predict page access patterns and page accesses while taking advantage of a default prediction scheme for many memory page accesses.

Figure 1:
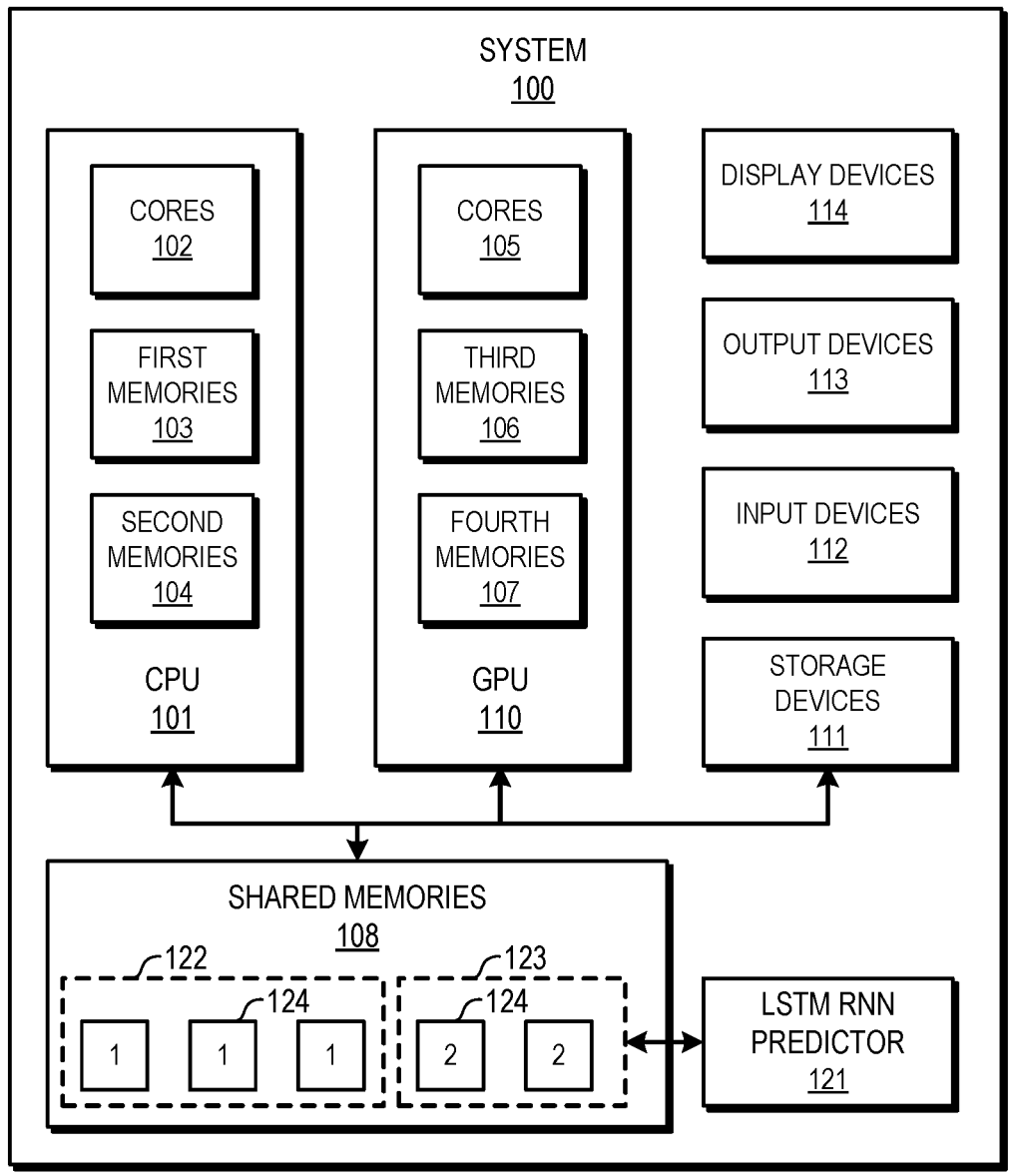
FIG. 1 is a block diagram illustrating a processing system for assigning memory pages to memories in accordance with some embodiments.

FIG. 1 is a block diagram illustrating a processing system 100 that assigns memory pages to memories based on memory page access patterns in accordance with some embodiments. The system 100 includes a central processing unit (CPU) 101, a graphics processing unit (GPU) 110, and one or more of storage devices 111, input devices 112, output devices 113, and display devices 114. The system also includes one or more shared memories 108. The CPU 101, the GPU 110, the shared memories 108, and the storage devices 111 are coupled together and communicate with one another by passing bits between the various entities. The CPU 101 includes, for example, cores 102 for processing instructions and data, one or more first memories 103 having a first memory characteristic, and one or more second memories 104 having a second memory characteristic different from the first memory characteristic. The GPU 110 includes, for example, cores 105 for processing instructions and data, one or more third memories 106 having a third memory characteristic, and one or more fourth memories 107 having a fourth memory characteristic different from the third memory characteristic. The system 100 is illustrative of a heterogeneous environment in which behaviors of data pages are sometimes difficult to predict and accommodate due to the differing characteristics of the various memories 103, 104, 106, 107, 108. For example, memory pages 124 at designated times need to be moved from one or more of the shared memories 108 to at least one of the second memories 104 and the fourth memories 107.

To enhance processing, the processing system 100 implements a memory management scheme wherein the memory pages 124 are identified and sorted into a first set 122 and a second set 123 based on a total number of memory accesses from memory pages in the last E epochs. Based on this sorting, certain pages of the second set 123 are subjected to a long short-term memory (LSTM) recurrent neural network (RNN) predictor 121 to obtain an improved estimate of frequency of future access of those pages by the CPU 101 and the GPU 110. In some embodiments, more than one instance of an LSTM RNN is operative in the predictor 121 to accommodate more than one set of memory pages 124.

For example, a first set of memory pages 124 is provided to a first LSTM rinstance. Each LSTM instance provides an improved prediction of memory page access by one or more of the CPU 101 and the GPU 110 for one or more patterns associated with certain memory pages 124. Specifically, each LSTM instance identifies memory pages 124 of the second set 123 to move from the shared memories 108 to one or more of the other memories 103, 104, 106, 107 as further described herein.

Figure 2:
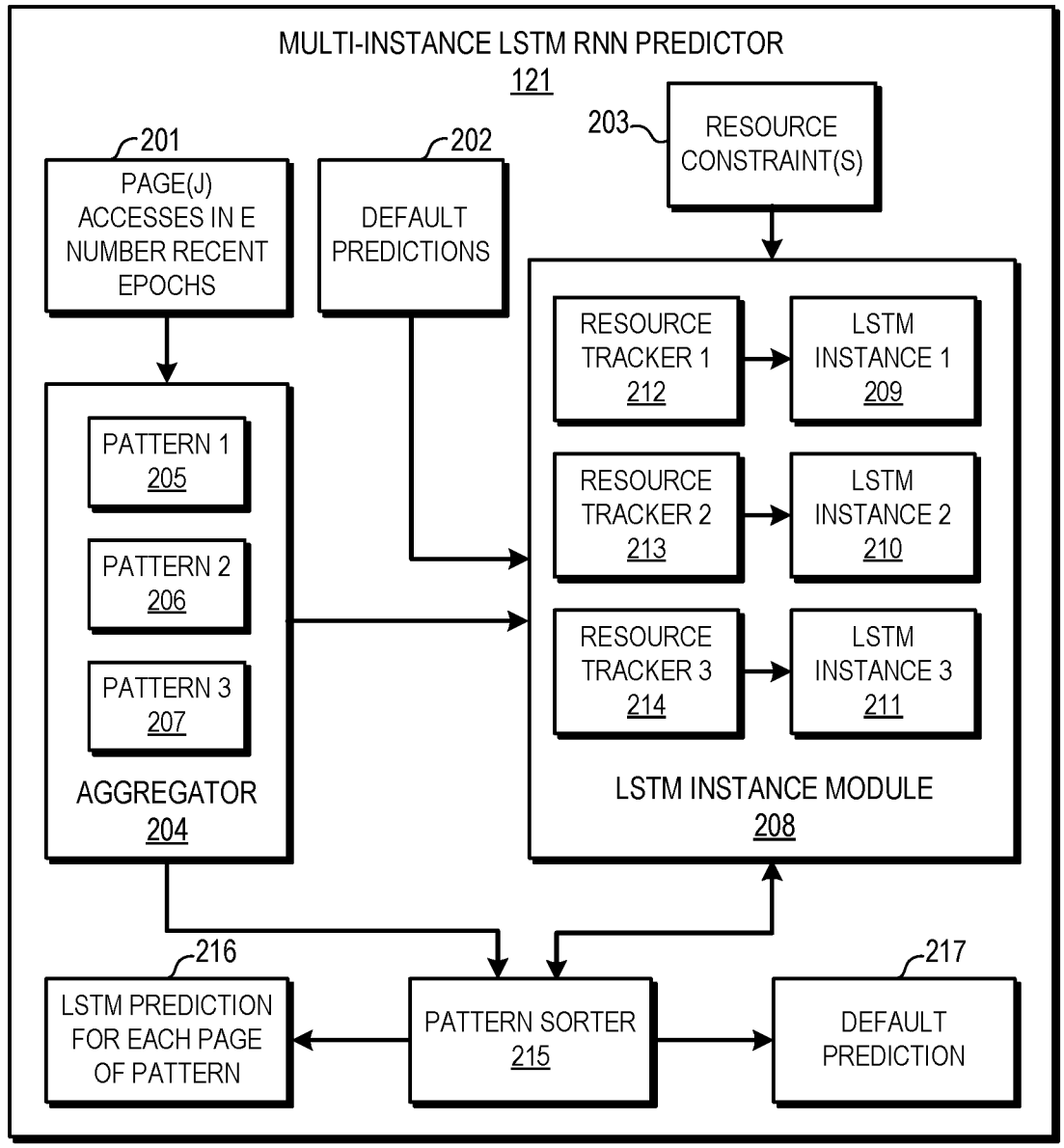
FIG. 2 is a block diagram illustrating components of a multi-instance long short-term memory (LSTM) recurrent neural network (RNN) predictor for the processing system of FIG. 1 in accordance with some embodiments.

FIG. 2 is a block diagram illustrating components of the multi-instance LSTM RNN predictor 221 for the system 100 in accordance with some embodiments. Certain inputs are determined by or provided to the LSTM RNN predictor 121 including: a number of page accesses 201 for memory pages, default predictions 202 for the memory pages, and one or more resource constraints 203. The number of page accesses 201 for each of a set of memory pages is determined where each memory page is referred to as page(j). The number of accesses is determined for E number of recent epochs or time periods. For example, an epoch length is one of one second, 100 milliseconds, 10 milliseconds, 5 milliseconds, 1 millisecond, and 100 microseconds. Other sizes of epoch are possible and are subject to tuning of the LSTM instances. Each epoch may be of a same or of a different size as each other. According to some embodiments, the E number of epochs are a set of contiguous time periods directly prior to a current epoch.

Based on the page accesses 201, an aggregator 204 generates one or more page access patterns for one or more pages provided or assigned to the LSTM RNN predictor 121. The predictor 121 determines which memory page access pattern of the patterns 205-207 is a most similar pattern for each of the pages. Pages having a same or a similar number of page accesses are grouped together and associated with one of the patterns. Each of the pages is provided with a pattern indicator for tracking purposes such as a semi-unique number in a dedicated page access vector (not illustrated). As illustrated, and by way of example, three patterns 205-207 are identified and provided by the aggregator 204 as Pattern 1 (205), Pattern 2 (206), and Pattern 3 (207). According to at least some embodiments, the patterns 205-207 are identified by counting a number of accesses in a register for a current epoch and maintaining the number of accesses in a respective historical register for each of the previous E number of recent epochs.

Each of the patterns 205-207 may be of fixed character or of a dynamic character. By way of example, a first pattern such as Pattern 1 (205) corresponds to a number of accesses at or in excess of a first threshold $T_1$, a second pattern such as Pattern 2 (206) corresponds to a number of accesses between the first threshold $T_1$ and a second threshold $T_2$, and a third pattern such as Pattern 3 (207) corresponds to a number of accesses at or below the second threshold $T_2$. Values of the first and second thresholds $T_1$ and $T_2$ are either static or dynamic. In some embodiments, a number of patterns and grouping of pages into the patterns is performed by way of k-means clustering with k being a number known ahead of time. Such clustering partitions n number of memory pages into P number of patterns 205-207 where the patterns 205-207 are clusters where each memory page belongs to the pattern with a nearest mean number of page accesses in the E number of recent epochs and the P number of patterns 205-207 is matched to a same number of LSTM instances operative in the processing system. In other embodiments, the problem of grouping pages with similar access patterns together can be reduced to data-series clustering.

According to some embodiments, there are two components in a clustering: a measure of similarity, and a clustering algorithm. For similarity, some examples include a distance measure between time-series values by calculating a correlation for a degree of similarity between the time-series values, a Fréchet distance, and a dynamic time warping distance (DTWD)). For a clustering algorithm, one example is a partitional clustering which requires a number of clusters specified in advance where the number of clusters is the same as the number of available LSTM instances. At each step in the clustering algorithm, all objects in the original set are matched to the cluster represented by their closest centroid (e.g., an average distance from all elements currently in that cluster), and the centroids are updated over time such as once for each epoch. According to some embodiments, initial clusters and initial centroids are chosen randomly from R number of original memory pages.

One or more resource constraints 203 are provided to LSTMs of a set of LSTM instances 209-211 where the LSTM instances 209-211 are operative in an LSTM instance module 208 of the LSTM RNN predictor 121. According to some embodiments, the resource constraints 203 are dynamically provided on a same or different time basis (e.g., for the E number of recent epochs) as determination of the patterns 205-207 by the aggregator 204. Each LSTM instance 209-211 is paired with one or more respective resource trackers 212-214. As illustrated, one tracker 212-214 is paired with a respective LSTM instance 209-211. Each resource tracker 212-214 monitors consumption of resources by its respective LSTM instance 209-211. Each resource tracker 212-214 follows one or more particular resources. For example, one or more of the resource trackers 212-214 tracks a number of cores available for use by its particular LSTM instance 209-211, a number of cores available for use by all of the LSTM instances 209-211, an amount of memory available for use by its particular LSTM instance 209-211, an amount of memory available for use by all of the LSTM instances 209-211, and an amount of power available for consumption by one or all of the LSTM instances 209-211. For sake of ease of illustration, the resource trackers 212-214 are included in the LSTM instance module 208.

A pattern sorter 215 sorts the determined patterns 205-207 based on a total number of memory accesses for member pages in the last E number of recent epochs, or according to another basis such as a number of memory accesses for member pages in a most recent epoch, in one epoch of the last E number of recent epochs, and a largest number of memory accesses for member pages in the last E number of recent epochs. According to some embodiments, the predictor 121 assigns a top $P_{top}$ number of patterns to the LSTM instances 209-211 of the instance module 208 where top refers to a number of accesses totaled over the last E number of recent epochs. The LSTM RNN predictor 121 determines a default prediction error based on a respective default prediction 202 provided to or generated by the LSTM RNN predictor 121. If a respective prediction error is relatively accurate for a particular page, a default prediction 217 of accesses to the memory page is used in the system. According to some embodiments, the default prediction 217 is a type of memory page policy for a current memory management epoch. The default prediction 217 is based on an assumption that most frequently used pages from a previous epoch remain "hot" or frequently-accessed as determined by either an access count or a hotness rank. In some embodiments, the default prediction 217 works with and is provided to a memory scheduler (not illustrated) that performs prefetches of memory pages based on the default prediction 217.

In some embodiments, if the respective prediction error is too high for the particular page (e.g., exceeding a prediction threshold), the predictor uses one of the LSTM instances 209-211 to generate a more accurate memory page access prediction: an LSTM prediction 216. The LSTM prediction 216 is based on the respective pattern 205-207 and is provided by a respective LSTM instance 209-211. According to some embodiments, the LSTM prediction 216 is used for each page(j) that is associated with a particular pattern 205-207. If an LSTM prediction error for the particular page is lower than its default prediction error, the LSTM prediction 216 for the particular page is used if available. However, if the LSTM prediction error for the particular page is larger than its corresponding default prediction error, its default prediction 202 is used for the next epoch as its default prediction 217. In some embodiments, the LSTM prediction 216 works with and is provided to the memory scheduler which prefetches memory pages based on the LSTM prediction 216.

The default prediction 202 is a predicted number of memory accesses that the processing system is likely to make to a particular page during a current or a next epoch. For example, the default prediction 202 for a particular page is a geometric average of the number of page accesses in the last E number of recent epochs. The default predictions 202 are used for each of the pages unless updated to an improved prediction provided by one or more of the LSTM instances 209-211. Due to the resource constraints in any processing system, not all memory pages are likely to have an LSTM-based prediction from an LSTM instance 209-211 since LSTM instances are generally resource intensive. According to some embodiments, the LSTM prediction 216 is an access count in the next epoch or is a hotness rank for the particular page and the hotness rank is a position in an array of pages that is sorted by access count.

Figure 3:
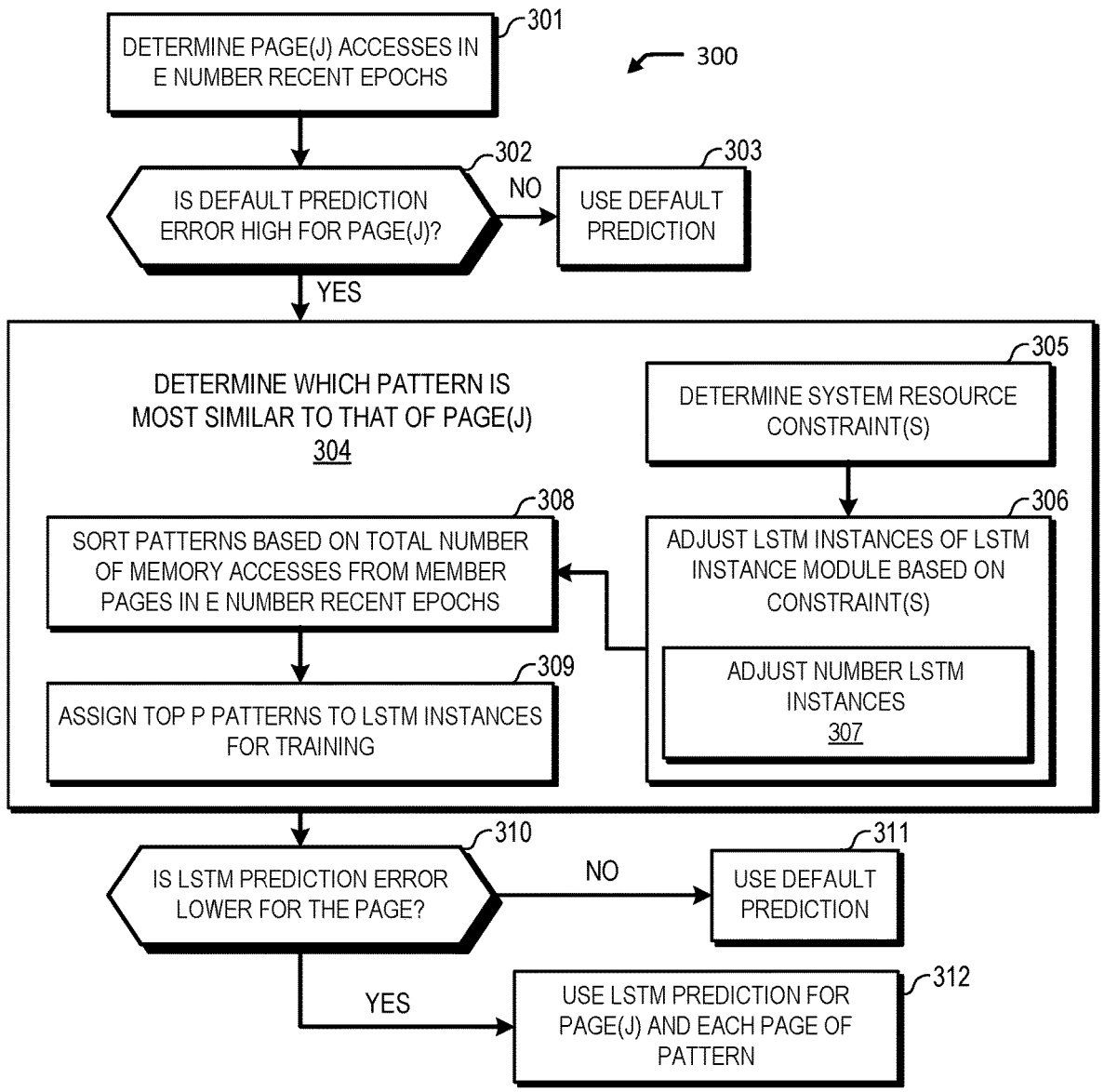
FIG. 3 is a flow diagram illustrating a method of use of a multi-instance LSTM RNN predictor for a processing system in accordance with some embodiments.

FIG. 3 is a flow diagram illustrating a method 300 of use of a multi-instance LSTM RNN predictor 121 for a processing system in accordance with some embodiments. At block 301, the predictor 121 determines a number of accesses for each memory page of a set of memory pages where each memory page is illustrated as page(j). The number of accesses is determined for E number of recent epochs. For example, the predictor 121 accesses a set of registers for tracking a particular memory page. This set of registers tracks pages by a memory page starting address or by a memory page identifier in the form of a unique or semi-unique set of bits.

At block 302, the predictor 121 determines whether a default prediction error is too high (e.g., in excess of an error threshold determinable for any given page) for each of the pages. For example, a prediction error is determined by comparing a predicted number of memory accesses to an error threshold value based on an average number of accesses and its corresponding standard deviation for the particular memory page. If the default prediction error is not too high, at block 303, the predictor 121 uses a default prediction such as a default value as a number of predicted accesses for the particular page(j) in a next epoch. In this case, an LSTM prediction for the particular page is not likely to be sufficiently good enough to improve upon the default prediction and the amount of computational energy associated with computing an LSTM prediction would not outweigh one or more benefits provided by generating the LSTM prediction.

If the default prediction error is too high at block 302, starting at block 304, the predictor 121 determines an improved predicted number of accesses for the particular page. According to some embodiments, only a relative few number of pages are passed to block 304 and subjected to LSTM-associated computational steps. For example, only a top fixed number of pages are allowed to pass from block 302 to block 304 based on sorting all pages by respective prediction error for a current epoch. As another example, only a top fixed percentage of pages are allowed to pass from block 302 to block 304 based on sorting all pages by respective prediction error for the current epoch. As yet another example, only a top fixed percentage of pages are allowed to pass from block 302 to block 304 based on sorting all pages by respective prediction error for the current epoch.

At block 304, the predictor 121 determines which pattern of a plurality of patterns such as patterns 205-207 is most similar to that of the particular page. For example, the pages passed to block 304 are sorted into patterns by way of performing k-means clustering. At block 305, the LSTM RNN predictor 121 determines one or more resource constraints and provides the one or more constraints to LSTMs of a set of LSTM instances such as LSTM instances 209-211. At block 306, the LSTM instances of an LSTM instance module such as those of LSTM instance module 208 are adjusted or updated based on the one or more system resource constraints. For example, if a system only has available 12 of 48 processing cores to share among the LSTM instances, the system determines how many LSTM instances are operable with that number of processing cores. At block 307, the predictor 121 adjusts the number of LSTM instances consistent with the newly determined one or more system resource constraints.

At block 308, based on one or more outputs from the LSTM instances, a set of a plurality of patterns is sorted based on a number of memory accesses associated with each respective pattern. At block 309, the predictor 121 assigns a top P number of patterns to the LSTM instances for training. At block 310, based on the determined pattern that is most similar to that of the particular page, the predictor 121 determines whether an LSTM prediction error for the particular page is lower than its corresponding default prediction error determined at block 302. If not, at block 311, the predictor 121 uses the default prediction for the particular page since the LSTM prediction error exceeds the default prediction. If so, at block 312, the predictor 121 uses the LSTM prediction for the particular page and for each page of the particular pattern corresponding to the particular page when the LSTM prediction is improved over its respective default prediction. According to some embodiments, use of the LSTM prediction at block 312 includes moving the particular memory page and a number n-1 of memory pages related thereto from a first memory to a second memory based on the LSTM prediction. Use of the LSTM prediction at block 312 also includes moving each memory page associated with a same pattern 205-207 as that of the particular memory page from a first memory to a second memory based on the LSTM prediction. In some embodiments, the second memory is more energy efficient than the first memory. In other embodiments, the second memory has a faster memory access time than a memory access time of the first memory.

Figure 4:
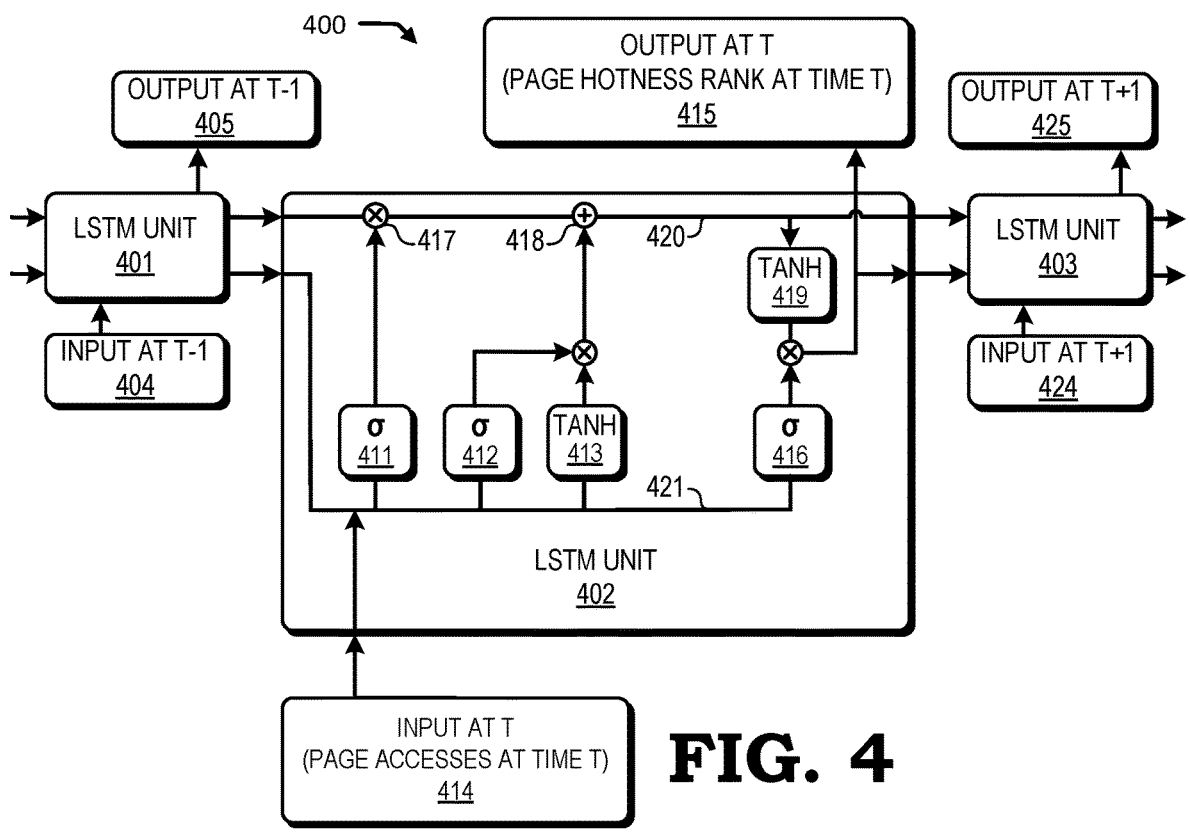
FIG. 4 is a block diagram illustrating an architecture of a portion of a LSTM RNN 300 according to some embodiments.

FIG. 4 is a block diagram illustrating an architecture of a portion of an LSTM RNN 400 as illustrative of each of the LSTM instances 209-211 according to some embodiments. The LSTM RNN 400 includes multiple layers of LSTM units 401-403 where each layer includes a plurality of LSTM units such as the LSTM units 401-403. The LSTM units 401-403 are memory cells. Some of the internal functions and features of a second LSTM unit 402 are illustrated in the LSTM RNN 400. The LSTM RNN 400 is capable of learning long-term dependencies for particular memory pages and their page accesses. The LSTM RNN 400 learns to bridge time intervals in excess of a certain number of steps (e.g., 500; 1,000; 5,000; and 10,000) depending on one or more various factors including information from a training dataset such as provided at block 309. Each step may be the same or different as an epoch E for counting a number of page accesses.

The LSTM RNN 400 includes pointwise multiplicative gate units 417 that learn to open and close access to a constant error flow and pointwise additive gate units 418 to couple information streams within any LSTM unit 401-403. Each LSTM unit 401-403 includes one or more inputs 404, 414, 424 and one or more outputs 405, 415, 425 at any given time represented with symbol T. For example, a first input 404 and a first output 405 are illustrated for time T−1. According to some embodiments, the LSTM RNN predictor 121 uses a number of page accesses at any given time as an input such as the page accesses at time T shown as the second input 414. The LSTM RNN predictor 121 provides a page hotness rank at any given time as an output such as the page hotness rank at time T shown as the second output 415. The hotness rank is a position in an array of pages that is sorted by predicted access count. The hotness rank is used to determine an improved predicted number of accesses for the particular page.

The LSTM RNN 400 includes one or more sigmoid layers 411, 412, 416 labeled as "σ." Each sigmoid layer outputs a number between zero and one. Each sigmoid layer determines how much of each respective component or variable should be let through. A value of zero translates to letting no amount of influence through at that particular time while a value of one translates to letting an unscaled amount of the variable through. The LSTM RNN 400 also includes one or more hyperbolic tangent layers 413, 419 labeled as "tanh." Each tangent layer 413, 419 outputs a number between minus one and positive one thereby determining how much of each respective component or variable should be let through. A value of minus one translates to reversing an influence of the variable at that particular time while a value of one translates to letting an unscaled amount of the variable through at that particular time.

Each LSTM unit 401-403 includes a unit state 420 that is represented as a first line that runs through a top portion of the unit 401-403. The unit state 420 keeps track of and stores various values including, for the particular memory page: an estimated predicted number of page accesses, an estimated error of the predicted number of page accesses, an amount of training time, a number of current and past LSTM instances, and a page migration frequency.

Each LSTM unit 401-403 also includes a hidden unit state 421 that is represented as a second line that runs through the LSTM unit 401-403 to perform calculations and make changes to the unit state 420. Each LSTM unit 401-403 operates the gates 417, 418 to protect and control the unit state 420. Each LSTM unit 401-403 includes at least three elements or functions: an input gate associated with a first sigmoid layer 411, a forget gate associated with both a second sigmoid layer 412 and a first hyperbolic tangent (tanh) layer 413, and an output gate associated with a third sigmoid layer 416. The second sigmoid layer 412 determines which values to update and the first tanh layer 413 creates a vector including one or more new candidate values to be added to the unit state 420. The three functions (input gate, forget gate, output gate) allow the LSTM units 401-403 to keep and access information over long periods of time. By stacking LSTMs, every layer in the LSTM RNN 400 is an LSTM in the hierarchy and subsequent units such as third unit 403 at time T+1 receives the hidden state of a previous unit such as the second unit 402 as input.

In other embodiments, deep LSTM (DLSTM) units and a DLSTM architecture are used instead of the LSTM units 401-403 and LSTM architecture as understood by those in the art. The LSTM RNN 400 allows processing of different time scales at different levels, and therefore a temporal hierarchy is created.

Figure 5:
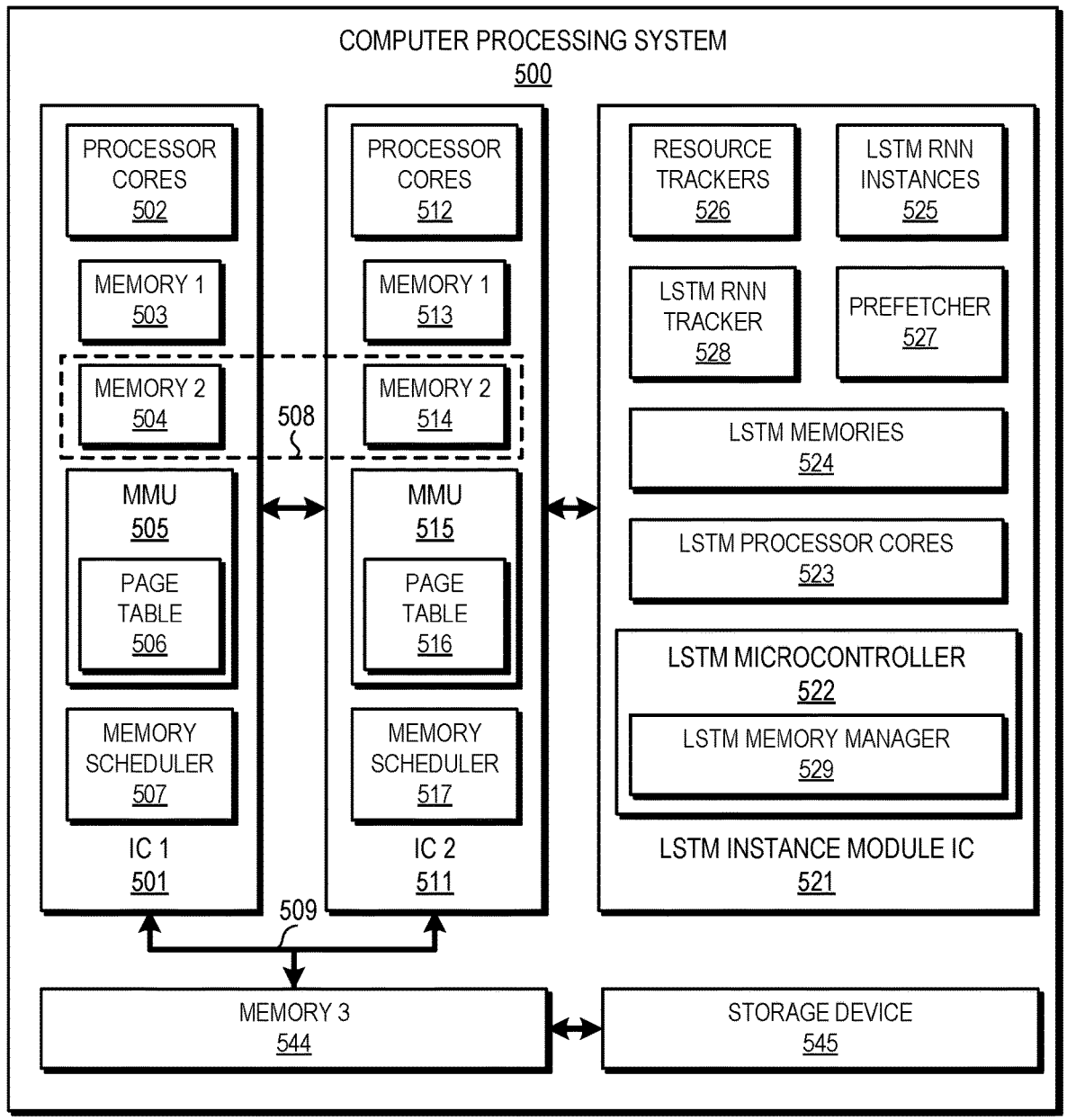
FIG. 5 is a block diagram illustrating a computing system for performing LSTM RNN prediction in accordance with some embodiments.

FIG. 5 is a block diagram illustrating a computer processing system 500 for performing LSTM RNN prediction in accordance with some embodiments. The system 500 includes a plurality of integrated circuit (IC) dies or ICs including first and second ICs labeled IC 1 (501) and IC 2 (511) and an LSTM instance module IC 521. The first IC 501 includes a set of processor cores 502, a first memory 503, a second memory 504, a memory management unit (MMU) 505 having a page table 506, and a memory scheduler 507. The second IC 511 includes a set of processor cores 512, a first memory 513, a second memory 514, a memory management unit (MMU) 515 having a page table 516, and a memory scheduler 517.

According to some embodiments, components of the second IC 511 are similar to analogous components of the first IC 501. For example, the second memory 514 has a same characteristic 508 as the first memory 503 where the characteristic is, for example, an energy efficiency, a memory access time relative to a processor core such as one of processor cores 502, 512, and an amount of the memory of the second memories 504, 514. In the ICs 501, 511, the first memories 503, 513 have a different characteristic from the second memories 504, 514 where the different characteristic is, for example, an energy efficiency, a memory access time relative to a processor core, and an amount of the memory. In operation, the second memory 504 provides instructions and data to the first memory 503. In turn, the first memory 503 provides instructions and data to one or more caches, reorder buffers, basic operation units and the like of the processor cores 502 as understood by those in the art. Memory operations for the ICs 501, 511 are managed by the MMUs 505, 515. The page tables 506, 516 facilitate translation between virtual memory pages and physical memory pages where physical memory pages are referenced by physical addresses.

The LSTM instance module IC 521 incorporates one or more components of an LSTM instance module such as LSTM instance module 208. The LSTM instance module IC 521 includes an LSTM microcontroller 522 having an LSTM memory manager 529, one or more LSTM processor cores 523, one or more LSTM memories 524, LSTM RNN instances 525, one or more resource trackers 526 such as one per LSTM instance, a prefetcher 527, and one or more LSTM RNN trackers 528. Each resource tracker 526 is either a physical tracker, a firmware-based tracker, or a software-based tracker. In the embodiment of a software-based tracker, a new resource tracker 526 is spawned for each new LSTM RNN instance 525 created, and killed for each LSTM RNN instance 525 deactivated.

The LSTM microcontroller 522 sends and receives signals and instructions to and from the first IC 501 and second IC 511 by way of a memory interconnect 509. The second memories 504, 514 communicate with a shared third memory 544, which in turn, communicates with one or more storage devices 545, which, in some embodiments, takes the form of a memory slower than the first memories 503, 513, the second memories 504, 514 and the third memory 544 as some conventional storage devices operate on same or similar physical principles as the other memories. In other embodiments, the shared third memory 544 takes the form of individual third memories formed in each of the first IC 501 and the second IC 502.

The LSTM RNN tracker 528 increments values in one or more buffers or vectors reserved for each resource consumed by the LSTM RNN instances 525. The LSTM RNN tracker 528 also includes values for configuration variables that are configured or set by way of one of a hardware operation, a firmware operation, a BIOS operation, or a software operation before or during operation of each LSTM RNN instance 525. Configuration values for the respective LSTM variables are provided by a user or an operating system such as at start-up time of the LSTM RNN instances 525. For example, the LSTM RNN tracker 528 keeps track of a number of LSTM RNN instances 525 in operation, a number and size of each of prior-in-time epochs E for use by the LSTM RNN instances 525, an amount of training time on a particular pattern, an identity of each pattern, a memory page migration frequency, and an identity tag for each memory page associated with a particular pattern and particular LSTM RNN instance 525. The LSTM tracker 528 provides certain values to the LSTM microcontroller 522 for the operation of the LSTM RNN instances 525. The LSTM tracker 528 also keeps a memory of the one or more constraints for the LSTM instance module 208, the LSTM instance module IC 521, and the constraints for the components in the LSTM instance module IC 521 including the LSTM RNN instances 525 and number of the same.

The constraints may be fixed or dynamic over time as the system 500 operates. The LSTM tracker 528 also keeps track of errors including prediction errors as determined by the LSTM RNN instances 525 and the LSTM microcontroller 522. In operation, the LSTM microcontroller 522 decides whether to spawn a new LSTM instance if there are unused resources designated for the LSTM RNN instances 525 as a total FIG. 4 serve as a one and only resource limitation input to the LSTM instance module IC 521 and LSTM microcontroller 522. In other embodiments, resource usage of the LSTM RNN instance 525 and the workload that owns the particular page accesses 414 serve as inputs to the LSTM microcontroller 522.

Based on output from the LSTM RNN instances 525, the prefetcher 527 communicates with the memory schedulers 507, 517 so that one of the memory schedulers 507, 517 pulls pages from the third memory 544 into its respective second memory 504, 514. For example, for a particular pattern, one of the LSTM RNN instances 525 provides an output to the prefetcher 527, which, in turn, provides an instruction to the first memory scheduler 507 to pull a current number of predicted pages into the second memory 504 beginning at a starting memory address for a particular epoch ahead of demand for the predicted pages. In some embodiments, stride prefetchers are used in place of the memory schedulers 507, 517.

Figure 6:
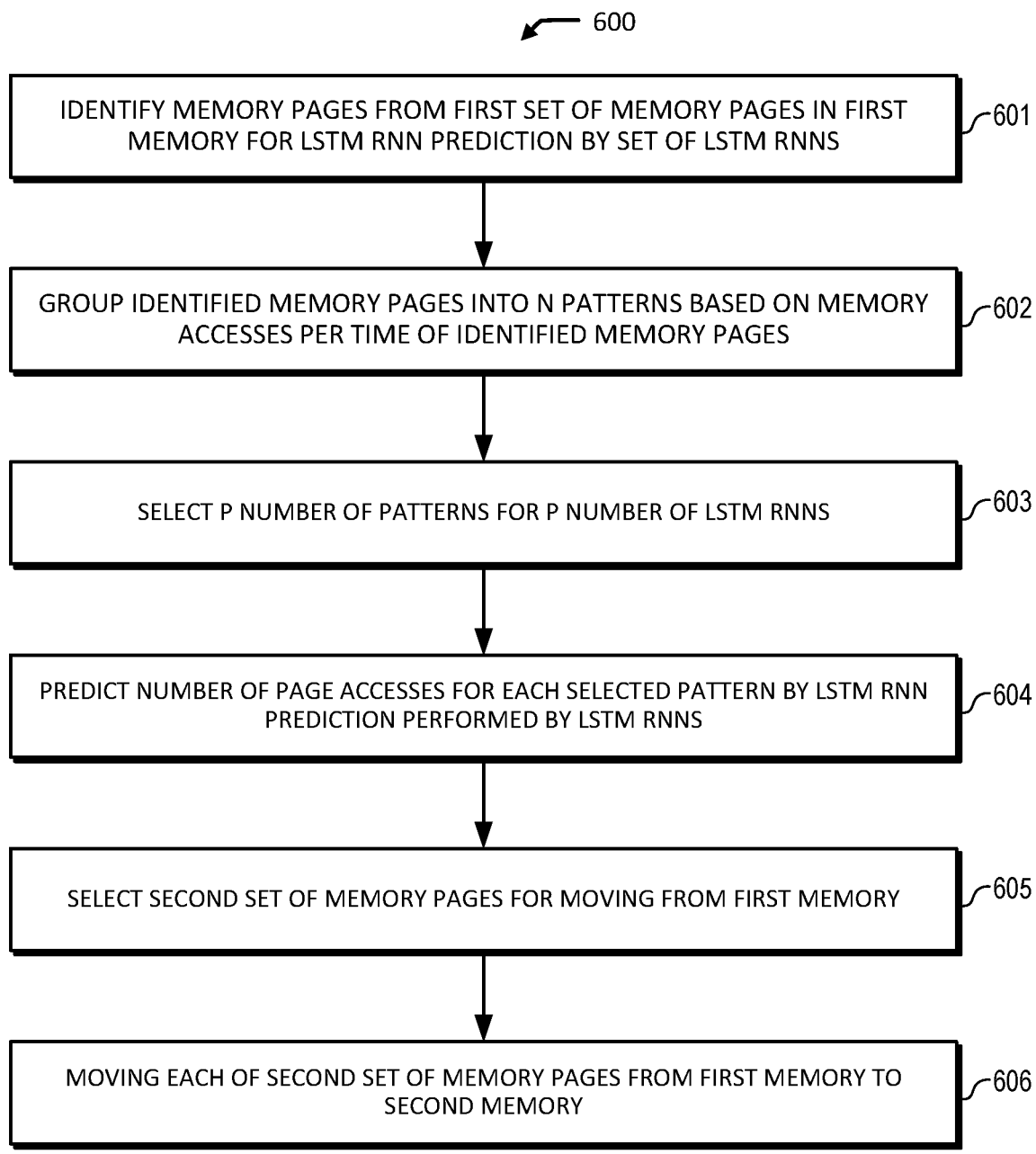
FIG. 6 is a block diagram illustrating a method for performing LSTM RNN prediction in accordance with some embodiments.

FIG. 6 is a block diagram illustrating a method 600 for performing LSTM RNN prediction in accordance with some embodiments. The method 600 includes memory page placement. At block 601, the method 600 includes identifying a plurality of memory pages from a first set of memory pages in a first memory for subsequent LSTM RNN prediction by a set of P number of LSTM RNNs. At block 602, identified memory pages are grouped into an N number of patterns based on a number of memory accesses per time of the respective identified memory pages. At block 603, a P number of patterns is selected for the P number of LSTM RNNs. At block 604, a number of page accesses is predicted for each P number of patterns of memory pages selected by LSTM RNN prediction performed by the LSTM RNNs. At block 605, a second set of memory pages is selected for moving from the first memory. And, at block 606, each of the second set of memory pages is moved from the first memory to a second memory.

In some embodiments, the apparatus and techniques described above are implemented in a system including one or more integrated circuit (IC) devices (also referred to as integrated circuit packages or microchips), such as the LSTM RNN predictor, memories, interconnects, processors, and processing cores described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer processing system comprising:
a first memory having resident therein a first set of memory pages;
a second memory having a characteristic different from a characteristic of the first memory, the second memory coupled to the first memory; and
a predictor circuit configured to:
determine one or more memory page access patterns from one or more long short term memory (LSTM) recurrent neural networks (RNNs);
responsive to a prediction error for non-LSTM RNN based predictions of a first number of page accesses for each of a plurality of memory pages from the first set of memory pages, predict, by operation of the one or more LSTM RNNs, a second number of page accesses for each determined one or more memory page access patterns; and
based on the predicted second number of page accesses, select a second set of memory pages from the plurality of memory pages for moving from the first memory to the second memory.

2. The computer processing system of claim 1, wherein the predictor circuit is further configured to:
identify the plurality of memory pages from the first set of memory pages in the first memory for the one or more LSTM RNNs;
group, by an aggregator of the predictor circuit, the memory pages of the identified plurality of memory pages into a number of memory page access patterns based on a number of memory accesses per time of the memory pages of the identified plurality of memory pages;
determine at least one of a P number of memory page access patterns for the one or more LSTM RNNs; and
move each of the second set of memory pages of the second set from the first memory to the second memory.

3. The computer processing system of claim 2, wherein:
the one or more LSTM RNNs include P number of LSTM RNNs; and
the predictor circuit provides the P number of memory page access patterns to the P number of LSTM RNNs, one memory page access pattern per LSTM RNN.

4. The computer processing system of claim 2, wherein:
the number of memory accesses per time is a total of page accesses over a last E number of recent epochs for the memory pages of the identified plurality of memory pages; and
grouping the memory pages into the number of memory page access patterns is based on the totals of page accesses over the last E number of recent epochs.

5. The computer processing system of claim 1, further comprising:
a pattern sorter, wherein the pattern sorter sorts the one or more memory page access patterns based on a total number of memory accesses by one or more processing cores across all pages of the memory page access patterns of the one or more memory page access patterns in a last E number of epochs; and
wherein the computer processing system trains each of the one or more LSTM RNNs based on at least one memory page access pattern of the sorted one or more memory page access patterns across the last E number of epochs.

6. The computer processing system of claim 5, wherein the memory pages are grouped based on a similarity measure as a function of a distance between memory accesses over the last E number of epochs.

7. The computer processing system of claim 2, wherein the second set of memory pages includes the grouped memory pages of the identified plurality of memory pages.

8. The computer processing system of claim 1, wherein the characteristic of the first memory and the second memory is one from a group of characteristics including: an energy efficiency, a memory access time, and an amount of the first memory relative to an amount of the second memory.

9. The computer processing system of claim 1, wherein the first memory is a set of physical memory modules on separate integrated circuit (IC) dies and coupled by a memory interconnect.

10. The computer processing system of claim 2, wherein identifying the plurality of memory pages by the predictor circuit comprises:
determining a number of memory page accesses in one or more E number of recent epochs for each memory page of the first set of memory pages in the first memory;
determining a prediction error for each memory page of the first set of memory pages;
sorting the memory pages of the first set of memory pages based on the prediction error determined for each memory page; and selecting a subset of the sorted memory pages for the grouping of the memory pages into the number of patterns.

11. A method for memory page placement in a computer processing system, the method comprising:
   determining a non-long short-term memory (LSTM) recurrent neural network (RNN) based prediction of a first number of page accesses for each memory page of a plurality of memory pages of a first set of memory pages in a first memory;
   responsive to a prediction error determined for each non-LSTM RNN based prediction of the first number of page accesses for each memory page, identifying a subset of memory pages from the plurality of memory pages for LSTM RNN prediction by a set of P number of LSTM RNNs;
   determining one or more memory page access patterns from the set of P number of LSTM RNNs;
   predicting a second number of page accesses for each of a P number of patterns of memory pages by the LSTM RNNs;
   responsive to selecting a second set of memory pages for moving from the first memory based on the predicted second number of page accesses; and
   moving each of the second set of memory pages from the first memory to a second memory.

12. The method of claim 11, further comprising:
   grouping the memory pages of the identified subset of memory pages into a number of patterns based on a number of memory accesses per time of the memory pages of the identified subset of memory pages;
   selecting the P number of patterns for the P number of LSTM RNNs based on the grouping of the memory pages;
   sorting the P number of patterns based on a total number of memory accesses across all memory pages of each pattern of the P number of patterns in a last E number of epochs; and
   training each of the LSTM RNNs with a subset of the sorted P number of patterns having a highest total number of memory accesses across the last E number of epochs.

13. The method of claim 12, wherein the second set of memory pages includes at least each of the identified subset of memory pages used for grouping the memory pages into the number of patterns.

14. The method of claim 12, wherein the memory pages are grouped based on a similarity measure of a respective memory page access pattern of the memory pages within an E number of recent epochs.

15. The method of claim 12, wherein the memory pages are grouped based on a similarity measure of a respective memory access pattern of the memory pages within an E number of recent epochs.

16. The method of claim 12, wherein:
   the number of memory accesses per time is a total of page accesses over a last E number of recent epochs for the respective memory pages of the identified subset of memory pages; and
   selecting the P number of patterns is based on the totals of page accesses over the last E number of recent epochs.

17. The method of claim 12, wherein identifying the subset of memory pages includes:
   determining a number of memory page accesses in one or more E number of recent epochs for each memory page of the first set of memory pages in the first memory;
   determining the prediction error for each memory page of the first set of memory pages;
   sorting the memory pages of the first set of memory pages based on the prediction error determined for each memory page; and
   selecting a subset of the sorted memory pages for the grouping of the memory pages into the number of patterns.

18. The method of claim 11, further comprising:
   identifying one or more resource constraints for operation of the set of P number of LSTM RNNs; and
   adjusting a resource requirement of the set of P number of LSTM RNNs,
      wherein the resource requirement is at least one of:
      a number of processing cores designated for the set of P number of RNNs;
      an amount of memory designated for the set of P number of LSTM RNNs; and
      a number instances of the LSTM RNNs in the set of P number of LSTM RNNs operative in the computer processing system in response to a change in at least one of the number of processing cores and the amount of memory designated for the set of P number of LSTM RNNs.

19. The method of claim 18, wherein:
   identifying the one or more resource constraints for operation of the set of P number of LSTM RNNs is performed by a resource tracker associated with a respective LSTM RNN; and
   the set of P number of LSTM RNNs are controlled by a LSTM microcontroller.

20. The method of claim 11, wherein identifying the subset of memory pages from the first set of memory pages includes selecting memory pages having a highest access rate from the memory pages of the first set of memory pages.

* * * * *